United States Patent
Jacob et al.

(10) Patent No.: US 8,492,447 B2
(45) Date of Patent: Jul. 23, 2013

(54) CLOSED CELL PROPYLENE-ETHYLENE FOAM

(75) Inventors: Sunny Jacob, Seabrook, TX (US); Abdelhadi Sahnoune, Houston, TX (US); Jun Tong, Shanghai (CN); Randal Howard Kerstetter, Wadsworth, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 539 days.

(21) Appl. No.: 12/060,546

(22) Filed: Apr. 1, 2008

(65) Prior Publication Data

US 2009/0247656 A1 Oct. 1, 2009

(51) Int. Cl.
| | |
|---|---|
| C08J 9/00 | (2006.01) |
| C08J 9/06 | (2006.01) |
| C08J 9/08 | (2006.01) |
| C08J 9/10 | (2006.01) |
| C08J 9/12 | (2006.01) |
| C08F 110/00 | (2006.01) |

(52) U.S. Cl.
USPC ............. 521/96; 521/143; 521/144; 525/194; 525/240

(58) Field of Classification Search
USPC ................. 521/143, 96, 144; 525/194, 240
See application file for complete search history.

(56) References Cited

U.S. PATENT DOCUMENTS

| | | | |
|---|---|---|---|
| 3,950,278 A | 4/1976 | Wada et al. | |
| 4,421,867 A | 12/1983 | Nojiri et al. | |
| 4,540,753 A | 9/1985 | Cozewith et al. | |
| 4,607,060 A | 8/1986 | Kmiec et al. | |
| 4,870,114 A * | 9/1989 | Hashimoto et al. | 521/96 |
| 5,883,145 A | 3/1999 | Hurley et al. | |
| 6,001,484 A | 12/1999 | Horrion et al. | |
| 6,072,003 A | 6/2000 | Horrion et al. | |
| 6,812,292 B2 | 11/2004 | Terano et al. | |
| 2004/0236042 A1 | 11/2004 | Datta et al. | |
| 2005/0029696 A1 | 2/2005 | Wu et al. | |
| 2005/0029697 A1 | 2/2005 | Wu et al. | |
| 2005/0282920 A1 | 12/2005 | Wu | |
| 2006/0100379 A1 * | 5/2006 | Ouhadi | 525/240 |

(Continued)

FOREIGN PATENT DOCUMENTS

| | | |
|---|---|---|
| DE | 2 238 366 | 3/1974 |
| EP | 1 295 910 | 3/2003 |

(Continued)

OTHER PUBLICATIONS

U.S. Appl. No. 11/635,332, filed Dec. 7, 2006, Inventor: Westwood, et al., entitled Process for Making Dynamically-Loaded Articles Comprising Propylene-Based Elastomers, Composition for Use in Such Processes, and Articles Made Using Such Processes.

(Continued)

*Primary Examiner* — Randy Gulakowski
*Assistant Examiner* — Kara Boyle (57) ABSTRACT

A closed cell foam material contains a propylene based polymer comprising from about 5% to about 32% by weight α-olefin units. The propylene based polymer has a heat of fusion, as determined by DSC, of less than 80 J/g. The material also contains 0.5 to 5 phr peroxide, 1.0 to 5.0 phr blowing agent, and 0.1 to 10 phr co-agent. The cells of closed cell foam material have a diameter in the range of 0.1 to 1.5 mm.

16 Claims, 1 Drawing Sheet

U.S. PATENT DOCUMENTS

| | | |
|---|---|---|
| 2006/0205833 A1 | 9/2006 | Martinez et al. |
| 2007/0251572 A1 | 11/2007 | Hoya et al. |
| 2009/0030099 A1* | 1/2009 | Chino et al. .................. 521/139 |

FOREIGN PATENT DOCUMENTS

| | | |
|---|---|---|
| JP | 58142917 | 8/1983 |
| JP | 4342743 | 11/1992 |
| JP | 2000/198889 | 7/2000 |
| JP | 2001/106847 | 4/2001 |
| JP | 2006001962 A * | 1/2006 |
| WO | 2007/084219 | 7/2007 |

OTHER PUBLICATIONS

XP-002523640, Aug. 11, 2005, Abstract.

Ver Strate et al., "*Near Monodisperse Ethylene-Propylene Copolymers by Direct Ziegler-Natta Polymerization. Preparation, Characterization, Properties*", Macromolecules, 1988, vol. 21, pp. 3360-3371.

\* cited by examiner

CLOSED CELL PROPYLENE-ETHYLENE FOAM

FIELD OF THE INVENTION

This invention relates to foamed materials. More particularly, the present invention is directed to low specific gravity propylene foam and a method of manufacturing the foam.

BACKGROUND OF THE INVENTION

Foam materials are typically classified as either rubber based foam materials or plastic based foam materials depending on the raw material. The applications for the different foam materials will also differ based on the different physical properties. Polyurethanes and polyethylenes of varying densities have been used as the raw material in the foaming process of manufacturing a plastic foam material. The manufactured plastic foam material may be cold-molding or hot-molding to form products having complicated shapes, may use simple foaming recipes, and may be easily colored. The foaming process and applications of products made therefrom are well known. The disadvantages of plastic foams however, are poor elasticity and poor slip resistance.

Rubber materials such as acrylonitrile butadiene rubber (NBR) have been used as the raw material in the process of manufacturing a rubber foam material. The manufactured rubber foam material provides weather-proof and physical properties different from plastic foams. However, compounding for rubber foam materials can become relatively complex. Additionally, crosslinking of the rubber compound must be controlled so that expansion of the rubber into the desired cellular structure may be achieved.

Foam materials may also be classified by the cellular structure. Open cells means the cells in the material are interconnected to provide openings to an external surface of the material. A closed cell foam material is one wherein the cells are surrounded by material membranes and are not interconnected to each other; the closed cell foam may have broken cells at the material surface, however, liquids could not pass from such a surface broken cell to the interior of the foam as it would with open cell foam.

U.S. Pat. No. 3,950,278 discloses a cross-linked polyolefin foam. The foam compound is comprised of ethylene and an uncrosslinkable propylene. To achieve the desired cellular content, the percent of propylene is restrained between 20 and 60%.

U.S. Pat. No. 4,421,867 discloses a cross-linked polyolefin foam. The foamed material comprises 80 to 20% polyethylene and 20 to 75% of a crystalline propylene copolymer containing 1 to 15 weight % ethylene, with the propylene copolymer having a greater than 50% crystallinity.

SUMMARY OF THE INVENTION

The present invention is directed to a closed cell crosslinked foam. The foams are a soft, elastic foam having good anti-skid/traction properties. The foam has a specific gravity lower than conventional TPU foams, yielding a lighter weight foam that may be useful in situations where increased thickness of cushioning or padding is desired.

Disclosed herein is a composition useful for making a closed cell polyolefin foam. The composition comprises a propylene based polymer comprising having from about 5% to about 32% by weight α-olefin units. The polymer has a heat of fusion, as determined by DSC, of less than 80 J/g. the composition additionally contains about 0.5 to 5 phr peroxide, about 1.0 to 5.0 phr blowing agent; and not more than 10 phr co-agent.

In one aspect of the disclosed invention, the propylene based polymer in the composition has a crystallinity of less than 40%. Additionally, the polymer may have a melt temperature of less than 110° C.

In another aspect of the disclosed invention, the propylene based polymer in composition useful for making a closed cell foam is comprised of one or more $C_2$ and/or $C_4$-$C_{20}$ α-olefin comonomer units. Suitable α-olefin units of the propylene based polymer may be derived from ethylene, butane, pentene, hexane, or octane units. Preferably, the propylene based polymer comprises from about 8% to about 25% by weight of the α-olefin units.

In another aspect of the disclosed invention, the propylene based polymer in composition useful for making a closed cell foam may be comprised of one or more diene derived comonomer units. Suitable diene derived units include, but are not limited to, 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof.

In yet another aspect of the disclosed invention, the composition useful for making a closed cell foam may include a secondary thermoplastic or thermoelastic material. Such a secondary material may be present in amounts greater than 5 phr.

Also disclosed herein is a crosslinked polyolefin foam material having a closed cell structure. The material contains a propylene based polymer comprising from about 5% to about 32% by weight α-olefin units. The propylene based polymer has a heat of fusion, as determined by DSC, of less than 80 J/g. The material also contains 0.5 to 5 phr peroxide, 1.0 to 5.0 phr blowing agent, and not more than to 10 phr co-agent.

In one aspect of the disclosed invention, the propylene based polymer in the foam material has a crystallinity of less than 40%. Additionally, the polymer has a preferred melt temperature of less than 110° C.

In another aspect of the disclosed invention, the propylene based polymer in the foam material is comprised of one or more $C_2$ and/or $C_4$-$C_{20}$ α-olefin comonomer units. Suitable α-olefin units may be derived from ethylene, butane, pentene, hexane, or octane units.

In another aspect of the invention, the propylene based polymer in the foam material may contain one or more diene derived comonomer units. Suitable diene derived units include, but are not limited to, 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof.

In another aspect of the invention, the cells of closed cell foam material have a diameter in the range of 0.1 to 1.5 mm. Preferably, the majority of the closed cells have a diameter in the range of 0.1 to 1.0 mm.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

The inventive foam is a generally uniform closed cell structure of low specific gravity. The base material of the foam is a propylene based elastomer. The propylene-based elastomer, which may also be referred to as propylene-α-olefin copolymer, includes propylene derived units, one or more $C_2$ and/or $C_4$-$C_{20}$ α-olefin derived comonomer units, and optionally one or more diene-derived comonomer units. In one or more embodiments, the α-olefin comonomer units may derive from ethylene, butene, pentene, hexane, and octene. Exemplary diene comonomer units include, but are not limited to, 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof.

The α-olefin comonomer content of the propylene based elastomer is from about 5 to about 35% by weight. In one or more embodiments, the α-olefin is at least 6% by weight, in other embodiments, the α-olefin is at least 8% by weight, and in other embodiments, the α-olefin is at least 10% by weight. An upper weight percentage of the α-olefin content is up to 32% by weight in some embodiments, up to 25% by weight in other embodiments, up to 20% by weight in other embodiments, and up to 16% by weight in still other embodiments. The weight range percentage of the α-olefin may be any combination of a lower weight percentage with a upper weight percentage; for example, 5 to 32%, 5 to 20%, 8 to 25%, 8 to 32%, or 10 to 20%.

In some embodiments, if there is more than one α-olefin comonomer present, the amount of a particular comonomer may be less than 5% by weight, but the combined comonomer is preferably about 5% by weight. The total weight percentage of α-olefins in such a blend is within the above weight percentages of about 5 to about 35%, with the various possible lower and upper weight percentages. Particular embodiments of polymers having more than one α-olefin include propylene-ethylene-octene, propylene-ethylene-hexene and propylene-ethylene-butene polymers.

Also, stated conversely, the polymer may include at least 75% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units.

When the polymer further comprises a diene-derived unit, the propylene-based elastomer may include at least 0.5% by weight, in other embodiments at least 1.5% by weight, and in other embodiments at least 3% by weight diene-derived units. An upper weight percentage of diene-derived units in the elastomer is up to 11% by weight in some embodiments, up to 6% by weight in other embodiments, and up to 4% in still other embodiments. The range of weight percentage of the diene-derived units may be any combination of a lower weight percentage with a upper weight percentage; for example, 0.5 to 4%, 0.5 to 6%, 1.5 to 6% or 3 to 11%.

All of the above percentages by weight are based upon the total weight of the propylene-derived, α-olefin-derived, and diene-derived units.

The embodiments described below are discussed with reference to ethylene as the α-olefin comonomer, but the embodiments are equally applicable to other copolymers with other α-olefin comonomers. In this regard, the copolymer may simply be referred to as propylene-based elastomers with reference to ethylene as the α-olefin.

In one or more embodiments, the propylene-based elastomer can have a weight average molecular weight ($M_w$) of about 5,000 to about 5,000,000 g/mole, in other embodiments a $M_w$ of about 10,000 to about 1,000,000 g/mole, in other embodiments a $M_w$ of about 20,000 to about 500,000, g/mole and in other embodiments a $M_w$ of about 50,000 to about 400,000 g/mole.

In one or more embodiments, the propylene-based elastomer can have a number average molecular weight ($M_n$) of about 2,500 to about 2,500,000 g/mole, in other embodiments a $M_n$ of about 5,000 to about 500,000 g/mole, in other embodiments a $M_n$ of about 10,000 to about 250,000 g/mole, and in other embodiments a $M_n$ of about 25,000 to about 200,000 g/mole.

In one or more embodiments, the propylene-based elastomer can have a Z-average molecular weight ($M_z$) of about 10,000 to about 7,000,000 g/mole, in other embodiments a $M_z$ of about 50,000 to about 1,000,000 g/mole, in other embodiments a $M_z$ of about 80,000 to about 700,000 g/mole, and in other embodiments a $M_z$ of about 100,000 to about 500,000 g/mole.

In one or more embodiments, the molecular weight distribution (MWD=($M_w/M_n$)) of the propylene-based elastomer may be about 1 to about 40, in other embodiments about 1 to about 5, in other embodiments about 1.8 to about 5, and in other embodiments about 1.8 to about 3.

Techniques for determining the molecular weight ($M_n$, $M_w$ and $M_z$) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practices, and references cited therein. For example, molecular weight may be determined by size exclusion chromatography (SEC) by using a Waters 150 gel permeation chromatograph equipped with the differential refractive index detector and calibrated using polystyrene standards.

The propylene-based elastomer may be characterized by its crystallinity. The elastomer has a % crystallinity of from 0.5% to 40%, in some embodiments the crystallinity is 1% to 30%, and in other embodiments 5% to 25%, determined according to DSC procedures. Crystallinity may be determined by dividing the heat of fusion of a sample by the heat of fusion of a 100% crystalline polymer, which is assumed to be 189 joules/gram for isotactic polypropylene or 350 joules/gram for polyethylene. In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%.

The propylene-based elastomer preferably has a single broad melting transition. The melting point is defined as the temperature of the greatest heat absorption within the range of melting of the sample. However, the elastomer may show secondary melting peaks adjacent to the principal peak, but for purposes herein, such secondary melting peaks are considered together as a single melting point, with the highest of these peaks being considered the melting point ($T_m$) of the elastomer. The elastomer preferably has a melting point of from about 25° C. to 105° C., preferably from 25° C. to about 85° C., preferably from 25° C. to about 75° C., preferably about 25° C. to about 65° C., more preferably about 30° C. to about 80° C., more preferably about 30° C. to about 70° C. and more preferably about 30° C. to about 60° C.

The propylene-based elastomer can have a melt index (MI) (ASTM D-1238, 2.16 kg@190° C.), of less than or equal to 10 dg/min, in other embodiments ≦6.5 dg/min, in other embodiments ≦6 dg/min, in other embodiments ≦5.5 dg/min, and in other embodiments ≦5 dg/min.

In one or more embodiments, the propylene-based elastomer can have a melt flow rate (MFR), as measured according to the ASTM D-1238, 2.16 kg weight @ 230° C., equal to or greater than 0.3 dg/min, in other embodiments of at least 0.2 dg/min, in other embodiments at least 0.5 dg/min, and in other embodiments at least 1.0 dg/min. In these or other embodiments, the melt flow rate may be equal to or less than 350 dg/min, and in other embodiments less than 100 dg/min. In an embodiment, the propylene-based elastomer has an MFR of 0.5 dg/min to 350 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

Another characteristic of the propylene-based elastomer is the heat of fusion (Hf), as determined by DSC. In one or more embodiments, the propylene-based elastomer may be characterized by a heat of fusion that is at least 0.5 J/g, in other embodiments at least 1.0 J/g, in other embodiments at least 1.5 J/g, in other embodiments at least 3.0 J/g, in other embodiments at least 4.0 J/g, in other embodiments at least 6.0 J/g, and in other embodiments at least 7.0 J/g. In these or other embodiments, the propylene-based elastomer may be characterized by a heat of fusion of less than 80 J/g, in other embodiments less than 70 J/g, in other embodiments less than 60 J/g, in other embodiments less than 50 J/g, in other embodiments less than 40 J/g, in other embodiments less than 45 J/g, and in other embodiments less than 30 J/g.

As used within this specification, DSC procedures for determining $T_m$ and $H_f$ include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a Differential Scanning Calorimeter (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the heat of fusion (Hf) of the polymer. The melting point is recorded as the temperature of the greatest heat absorption with respect to a baseline within the range of melting of the sample.

The propylene-based elastomer can have a triad tacticity of three propylene units, as measured by $^{13}C$ NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the propylene-based elastomer may have a Mooney viscosity [ML (1+4) @ 125° C.], as determined according to ASTM D-1646, of less than 100, in other embodiments less than 75, in other embodiments less than 60, and in other embodiments less than 30.

In one or more embodiments, the propylene-based elastomer can have a density of about 0.85 $g/cm^3$ to about 0.92 $g/cm^3$, in other embodiments about 0.87 $g/cm^3$ to 0.90 $g/cm^3$, and in other embodiments from about 0.88 $g/cm^3$ to about 0.89 $g/cm^3$ at room temperature as measured per the ASTM D-792 test method.

In general, in a preferred embodiment, the propylene based elastomer has a molecular weight distribution MWD, Mw/Mn, of from about 1 to about 5, a heat of fusion less than or equal to 75 J/g and a melting point, $T_m$, not more than 105° C. Suitable propylene-based elastomers are available commercially under the trade names Vistamaxx™ (ExxonMobil Chemical Company, Houston, Tex., USA) and Versify™ (The Dow Chemical Company, Midland, Mich., USA).

To achieve foaming of the propylene-based material, the polymer is blended with blowing agents. The amount of blowing agent in the material to be foamed is in the range of 1.0 to 5.0 parts per hundred rubber (phr); in one embodiment, the amount of blowing agent is in the range of 2.0 to 5.0 phr. Useful blowing agents in the present invention include those which liberate gases such as nitrogen, carbon dioxide, ammonium bicarbonate and sodium bicarbonate and cause the formation of the desired closed cell structure. Exemplary blowing agents are nitro, sulfonyl and azo compounds such as dinitrosopentamethylene tetramine, N,N'-dimethyl-N,N'-dinitrosophthalamide, azodicarbonamide, phenyl-tetrazol, sulfonyl hydrazides such as benzenesulfonyl hydrazide, toluenesulfonyl hydrazide, oxi-bis-sulfo-hydrazid, and p,p'-oxy-bis-(benzenenesulfonyl)hydrazide and sulfonyl semicarbazides such as p-toluene sulfonyl semicarbazide and p,p'-oxy-bis-(benzenesulfonyl semicarbazide).

Other useful blowing agents include endothermic agents. Examples include mixtures of inorganic carbonates and polycarbonic acids, monosodium citrate, and other $CO_2$ releasing agents such as $NaHCO_3$.

The blended polymer is also cross-linked by the use of either high-energy radiation, irradiation crosslinking, moisture curing, or chemical cross-linking agents. Any curative that is capable of curing or crosslinking the rubber may be used to cure the inventive foaming compound. Non-limiting examples of chemical cross-linking agents useful in the present invention include organic peroxides, azido and vinyl functional silanes, multifunctional vinyl monomers, organotitantes, organo-zirconates, p-quinone dioximes, phenolic resins, maleimides, and silicon-containing curatives. The curative(s) selected will generally be dependant on the base rubber or any secondary rubbers blended into the foaming compound.

The following metal oxides are common curatives that will function in the present invention: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK products sold by DuPont).

Suitable organic peroxides include both alkyl and aralkyl peroxides. Examples include, but are not limited to, dicumylperoxide, 2,5-dimethyl-2,5-di(t-butylperoxy)hexane, 1,1-bis(t-butylperoxy)-3,3,5-trimethylcyclohexane, 1,1-di-(t-butylperoxy)-cyclohexane, 2,2'-bis(t-butylperoxy)diisopropylbenzene, α,α-bis(tert-butylperoxy)diisopropyl benzene, 4,4'-bis(t-butylperoxy)butylvalerate, t-butyl-perbenzoate, t-butylperterephthalate, t-butyl peroxide, benzoyl peroxide, cumene hydroperoxide, t-butyl peroctoate, methyl ethyl ketone peroxide, lauryl peroxide, and tert-butyl peracetate. Also, diaryl peroxides, ketone peroxides, peroxydicarbonates, peroxyesters, dialkyl peroxides, hydroperoxides, peroxyketals and mixtures thereof may be used. In accordance with one embodiment of the invention, the material to be foamed includes 0.5 to 5 phr of peroxide. In another embodiment, the amount of effective peroxide in the foamed material composition is in the range of 0.5 to 2.5 phr.

Illustrative radical generating agents include, but are not limited to, azo compounds. A coagent may be added to the polymer blend. This is most likely when using a peroxide and free radical generating curing systems as the coagent may enhance the effectiveness of the cross-linking. The use of a coagent for curing may also be determined based on the primary component of the foamed material; that is—the selection of the thermoplastic(s) or elastomer(s) present in amount greater than 25 or 30 phr in the foamed material. The amount of coagent in the foamed material is not more than 10 phr. In one embodiment, the amount of coagent is 0 phr; while in other embodiments, the coagent may be present in amounts in the range of 0.5 to 5 phr and 0.5 to 3 phr in yet other embodiments. Suitable coagents include di- and triallyl cyanurates and isocyanurates, liquid and metallic multifuncational acrylates and methacrylates, zinc-based dimethacrylates and diacrylates, and functionalized polybutadiene resins.

Additional components in the polymer blend may include activators. Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Acceleration of the cure process may be accomplished in the present invention by adding to the composition an amount of an accelerant, often an organic compound. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK™ HTS by Flexsys), 2-morpholinothio benzothiazole (MBS or MOR), blends of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas".

Other additives include, for example, fire/flame retardants, plasticizers, cure retarders, antioxidants, processing aids, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include antiblocking agents or lubricants.

The foams may also be prepared from blends including the propylene based elastomers discussed above and more than one additional thermoplastic or elastomers. The resulting blends may employ two, three, or more base elastomers or thermoplastics. Such additional thermoplastic or elastomers may be present in the foamed material in amounts of at least 5 phr.

Secondary thermoplastic polymers include the family of polyolefin resins, polyesters (such as polyethylene terephthalate, polybutylene terephthalate), polyamides (such as nylons), polycarbonates, styrene-acrylonitrile copolymers, polystyrene, polystyrene derivatives, polyphenylene oxide, polyoxymethylene, and fluorine-containing thermoplastics. Suitable thermoplastic resins may include crystallizable polyolefins that are formed by polymerizing $C_2$ to $C_{20}$ olefins such as, but not limited to, ethylene, propylene and $C_4$ to $C_{12}$ α-olefins, such as 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin, such as butene-1; pentene-1,2-methylpentene-1,3-methylbutene-1; hexene-1,3-methylpentene-1,4-methylpentene-1, 3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1 and dodecene-1, may also be used.

Modified thermoplastics may also be useful as additional components in the foam blend. Such modified thermoplastics include polyolefins having at least one functional groups attached thereto. In one or more embodiments, these functional groups can include carboxylic acid; $C_1$ to $C_8$ carboxylate ester such as carbomethoxy, carboethoxy, carbopropoxy, carbobutoxy, carbopentoxy, carbohexoxy, carboheptoxy, carboctoxy, and isomeric forms thereof, carboxylic acid anhydride; carboxylate salts formed from the neutralization of carboxylic acid group(s) with metal ions from Groups I, II, III, IV-A and VII of the periodic table, illustratively including sodium, potassium, lithium, magnesium, calcium, iron, nickel, zinc, and aluminum, and mixtures thereof, amide; epoxy; hydroxy; amino; and $C_2$ to $C_6$ acyloxy such as acetoxy, propionyloxy, or butyryloxy. In one or more embodiments, these functional groups may be part of an unsaturated monomer precursor that can be copolymerized with an olefin monomer or grafted onto a polyolefin to form the modified polyolefin.

Useful functionalizing monomers or agents include acrylic acid, methacrylic acid, maleic acid, maleic anhydride, acrylamide, methacrylamide, glycidyl acrylate, glycidyl methacrylate, vinyl acetate, vinyl butyrate, methyl acrylate, ethyl acrylate, butyl acrylate, 2-hydroxyethyl acrylate, sodium acrylate, zinc acrylate, the ionic hydrocarbon polymers from the polymerization of α-olefins with α,β-ethylenically unsaturated carboxylic acids. Useful modified polyolefins include those disclosed in U.S. Pat. Nos. 6,001,484, and 6,072,003, which are incorporated herein by reference.

Other useful thermoplastics useful for blending into the foam material are linear or branched triblock copolymers of styrene/conjugated diene/styrene, with the conjugated diene optionally being fully or partially hydrogenated, or mixtures thereof. Generally this triblock copolymer may contain 10 to 50 weight %, more preferably 25 to 35 weight %, of styrene and 90 to 50 weight %, more preferably 75 to 35 weight % of the conjugated diene, based on said block copolymer. Most preferred, however, is a block copolymer which contains 28 to 35 weight % of styrene and 68 to 72 weight % of the conjugated diene. The conjugated diene is selected from butadiene, isoprene or mixtures thereof. Triblock copolymers of the styrene/conjugated diene/styrene type are SBS, SIS, SIBS, SEBS, SEPS, and SEEPS block copolymers, and the branched or star-branched embodiments of them.

Suitable elastomeric rubbers useful for blending into the material to be foamed may include any rubber or mixture thereof that is capable of being crosslinked or cured. Reference to a rubber may include mixtures of more than one rubber. Useful rubbers typically contain some degree of unsaturation in their polymeric main chain. Some non-limiting examples of these rubbers include elastomeric ethylene copolymers such as ethylene-propylene rubber (EPR) and ethylene-propylene-diene rubber (EPDM), butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, polyisoprene rubber, epicholorohydrin terpolymer rubber, and polychloroprene.

The polymer to be foamed is blended in a manner to prevent decomposition of the blowing agent during mixing that could result in premature foaming of the polymer during mixing and a reduction of the cellular nature of the final compound. The base polymer is first mixed with all the ingredients but for the blowing agent. Once the components are sufficiently mixed, the blowing agent is added at the end of the mixing cycle.

After the polymer is blended, the polymer blend is placed in a mold, and subjected to heat and pressure to permit curing and activation of the blowing agent. Upon release of the mold, the cured compound expands, creating the cured closed cell foam.

The cured foam of the present invention is defined by a closed cellular structure. The closed cells have a diameter in the range of 0.1 to 1.5 mm; in another embodiment, the closed cells have a diameter in the range of 0.2 to 0.8 mm; and in another embodiment, the closed cells have a diameter in the range of 0.2 to 0.6. The majority of the cells have a diameter in the range of 0.1 to 1.0 mm in one embodiment, 0.2 to 0.8 mm in another embodiment and 0.3 to 0.5 mm in yet another embodiment.

The mold fill factor, i.e. the volume of the mold filled by the non-expanded foam material, has an effect on the appearance of the resulting foam. The greater the fill factor, the smaller the size of the resulting cells in the final foam. However, there is only minimal effect on the tear strength of the material, with improvements in both tensile strength and modulus for the foamed materials manufactured with a higher mold fill factor. The greatest change due to a variation in the mold fill factor is in the compression set, wherein the compression set is improved with greater fill factor. The mold should have a fill factor of at least 75%, and in some embodiments, of at least 90%.

In regards to physical properties of the foam material, the material has a specific gravity in the range of 0.05 to 0.70 g/cc. Alternatively, the material has a minimum specific gravity of about 0.10 in another embodiment, or a minimum specific gravity of about 0.20 in another embodiment.

The closed cell material has a Shore A hardness in the range of 40 to 85. For composition comprising lower levels of blowing agent, generally about less than 3.5 phr, the hardness has a range of 60 to 85. In another embodiment of a composition comprising low levels of blowing agent, the hardness has a range of 65 to 80. For compositions comprising a higher blowing agent content, e.g. generally greater than 3.5 phr, the hardness range is 40 to 75 in one embodiment, and 45 to 70 in another embodiment.

The 100% modulus is in the range of 0.2 to 1.0 MPa. For compositions comprising lower levels of blowing agent, about less then 3.5 phr, the 100% modulus has a range of 0.3 to 1.0 MPa in one embodiment, and 0.4 to 0.75 MPa in another embodiment. For compositions comprising blowing agents greater than 3.5 phr, the 100% modulus has a range of 0.2 to 0.8 MPa in one embodiment, and 0.2 to 0.5 MPa in another embodiment.

The foam material has a tear strength in the range of 2.5 to 9.5 N/mm. For compositions comprising lower levels of blowing agent, the tear strength has a range of 5.0 to 9.5 N/mm. For compositions comprising higher levels of blowing agent, the tear strength has a range of 2.5 to 5.5 N/mm.

Multiple examples of the polymer foam were blended and the physical properties of the foam were determined. Listings of materials used for all examples herein are set forth in Table 1 and methods of testing the material are set forth in Table 2.

TABLE 1

| Material Designation | Material | Commercial Name/Source (if applicable) |
|---|---|---|
| Polymer 1 | ethylene-propylene copolymer | Vistamaxx 6102; ExxonMobil Chemical Company, Houston, TX |
| Polymer 2 | diene modified ethylene-propylene copolymer, $C_2$ = 16%; ENB = 2.4%, MFR = 4 | |
| Polymer 3 | ethylene vinyl acetate - 18% VA | Escorene LD 720-62; ExxonMobil Chemical Company, Houston, TX |
| Polymer 4 | ethylene-propylene copolymer ~72% ethylene; melt index = 1.0 | Vistalon 722; ExxonMobil Chemical Company, Houston, TX |
| Polymer 5 | Ethylene octene copolymer | Exact 5361; ExxonMobil Chemical Company, Houston, TX |
| Polymer 6 | ethylene-propylene copolymer | Vistamaxx 3020; ExxonMobil Chemical Company, Houston, TX |
| Polymer 7 | Isotactic polypropylene | PP 5341; ExxonMobil Chemical Company, Houston, TX |
| Polymer 8 | polypropylene based random copolymer | RCP PD-9122; ExxonMobil Chemical Company, Houston, TX |
| Polymer 9 | Hydrogenated styrene ethylene butylene block copolymer | Kraton G 1652; Kraton Polymers LLC |
| Polymer 10 | Non-hydrogenated styrene butadiene block copolymer | Kraton D 1153E; Kraton Polymers LLC |
| Polymer 11 | ethylene vinyl acetate | EVA H2181; The Polyolefin Company |

TABLE 1-continued

| Material Designation | Material | Commercial Name/Source (if applicable) |
|---|---|---|
| Polymer 12 | C3-C67 maleic anhydride grafted polymer, mah - 0.7% | Exxelor VA 1803; ExxonMobil Chemical Company, Houston, TX |
| Polymer 13 | C8-C26 maleic anhydride grated polymer, mah - 0.35% | Exxelor VA 1840; ExxonMobil Chemical Company, Houston, TX |
| Antioxidant | tris(2,4-di-tert-butylphenyl) phosphite | Irgafos 168; CIBA Speciality Chemicals |
| Blowing Agent | Azodicarbonamide | Celogen 765A; Crompton Chemical/ChemTura Coporation |
| Peroxide 1 | dicumyl peroxide | Di-Cup R; Geo Specialty Chemicals |
| Peroxide 2 | di-(2-tert-butylperoxyisopropyl)benzene | Varox 802-402KE; R.T. Vanderbilt Company, Inc. |
| Co-agent 1 | triallyl cyanurate | SR507; Sartomer Company, Inc. |
| Co-agent 2 | trimethylolpropane trimethacrylate | Sartomer 350; Sartomer Company, Inc. |

TABLE 2

| Tested Property | Testing Method |
|---|---|
| Shrinkage, Length or Width | 1' square specimen cut from copolymer foam sheet, heated for 40 minutes @ 70 C, cooled for 30 minutes @ room temp, final dimensions measured. Average of three tests reported as percent shrinkage. |
| Specific Gravity | ASTM D 792-00 |
| Hardness | ASTM 2240 |
| 100% Modulus, MPa | ASTM D412 |
| Tear Strength, N/mm | Die C, ASTM D624 |
| Compression Set, % (50% at RT, 22 hrs) | ASTM D395B |
| Compression Set, % (50% at 50° C., 6 hrs) | ASTM D395B |
| Xylene Extraction, % Insoluble | 0.5 g foam sample is cut into small granular pieces. Specimen is placed in a Soxhlet extractor and extracted for 12 hours using boiling hexane. Fraction of insoluble specimen was dried in a vacuum oven for 12 hours and then weight. The amount of insoluble is reported in weight percent. |
| Coefficient of Friction (COF) | The average value of the ratio of the resistance-to-sliding force to the normal applied force during a measurement time of 30 seconds at a pulling speed of 1.2 mm/second. The measurements were performed using a Universal Micro-Tribometer Instrument (UMT-2) from CETR (San Jose, CA) on foam specimens of 19 mm diameter. The applied normal force was 1 Netwon and was kept constant thoughout the experiments. |

Examples A-H

In Examples A-H, the polymer is an ethylene-propylene copolymer having an ethylene content of 16% and a ΔH of 3.5 g/J. The amount of blowing agent was held constant while the amounts of two different peroxide curing agents and a coagent were varied. The propylene based copolymer was blended with all ingredients, but for the blowing agent, for approximately two minutes, then the blowing agent was added and the mix was blended for less than a minute.

The polymer blend was first compression molded on a cold press to study the cure kinetics and determine an optimum cure temperature and cure time. The polymer blend was then compression molded using the following steps: 90 grams of blend were measured; a mold was preheated to the cure temperature; the polymer blend was placed in the mold; the mold was closed and placed under pressure to prevent any premature release of gas; the mold temperature was maintained for the cure time; and at the end of the cure time, the mold pressure was released and the mold was opened. Upon opening the mold, the cured compound expanded.

For each polymer blend, A-H, the samples were prepared under two different conditions. The first set of conditions was a cure/foaming temperature of 160° C., with a cure time of 20 minutes. The second set of conditions was a cure/foaming temperature of 170° C. with a cure time of 10 minutes, so a higher cure temp but with a lower cure time. Physical properties of the samples at both test conditions are provided in Table 3 below. In Table 3, the properties of the foamed material prepared under the second test conditions are presented in the shaded lines immediately below properties of the foamed material prepared under the first test conditions.

TABLE 3

| | A | B | C | D | E | F | G | H |
|---|---|---|---|---|---|---|---|---|
| Material, phr | | | | | | | | |
| Polymer 1 | 100 | 100 | 100 | 100 | 100 | 100 | 100 | 100 |
| Stearic Acid | 0.6 | 0.6 | 0.6 | 0.6 | 0.6 | 0.6 | 0.6 | 0.6 |

TABLE 3-continued

|  | A | B | C | D | E | F | G | H |
|---|---|---|---|---|---|---|---|---|
| Zinc Oxide | 2 | 2 | 2 | 2 | 2 | 2 | 2 | 2 |
| Antioxidant | 0.2 | 0.2 | 0.2 | 0.2 | 0.2 | 0.2 | 0.2 | 0.2 |
| Blowing Agent | 2.3 | 2.3 | 2.3 | 2.3 | 2.3 | 2.3 | 2.3 | 2.3 |
| Peroxide 1 | 0.6 | 0.6 | 0.6 | 1 | | | | |
| Peroxide 2 | | | | | 1.5 | 1.5 | 1.5 | 1.5 |
| Co-agent 1 | 0.5 | 1 | 2 | 3 | 0.5 | 1 | 2 | 3 |
| Properties | | | | | | | | |
| Foaming Temp, °C. | 160 | 160 | 160 | 160 | 160 | 160 | 160 | 160 |
|  | 170 | 170 | 170 | 170 | 170 | 170 | 170 | 170 |
| Cure Time, Minutes | 20 | 20 | 20 | 20 | 20 | 20 | 20 | 20 |
|  | 10 | 10 | 10 | 10 | 10 | 10 | 10 | 10 |
| Length Shrinkage | 0.0 | 0.0 | −0.8 | 2.0 | 0.4 | 1.2 | 4.1 | 3.9 |
|  | 1.2 | 1.2 | 2.0 | 2.8 | 0.4 | 1.2 | 1.6 | 4.0 |
| Width Shrinkage | 0.0 | 0.0 | 1.6 | 2.3 | 0.0 | 1.2 | 3.2 | 4.3 |
|  | 2.2 | 1.2 | 0.8 | 1.6 | 5.1 | 1.2 | 2.5 | 3.5 |
| Specific Gravity | 0.218 | 0.229 | 0.235 | 0.285 | 0.214 | 0.246 | 0.278 | 0.362 |
|  | 0.221 | 0.229 | 0.240 | 0.272 | 0.198 | 0.226 | 0.271 | 0.302 |
| Hardness | 70 | 71 | 71 | 77 | 66 | 71 | 77 | 82 |
|  | 66 | 68 | 70 | 78 | 63 | 68 | 74 | 80 |
| 100% Modulus, Mpa | 0.3 | 0.3 | 0.4 | 0.6 | 0.3 | 0.4 | 0.6 | 0.9 |
|  | 0.3 | 0.3 | 0.4 | 0.6 | 0.3 | 0.4 | 0.50 | 0.8 |
| Tear Strength, N/mm | 6.3 | 7.0 | 7.6 | 9.0 | 6.1 | 7.0 | N/A | N/A |
|  | 7.0 | 7.2 | 7.1 | 8.4 | 5.5 | 6.8 | 7.3 | N/A |
| Compression Set, % | 15 | 9 | 22 | 15 | 30 | 16 | 14 | 16 |
| (25%, RT, 22 hrs) | 24 | 21 | 12 | 14 | 25 | 23 | 18 | 15 |
| Compression Set, % | 68 | 59 | 53 | 38 | 67 | 51 | 39 | 33 |
| (50%, 50° C., 6 hrs) | 75 | 62 | 58 | 46 | 73 | 59 | 41 | 39 |
| Xylene Extraction, % | 54 | 62 | 64 | 74 | 55 | 68 | 77 | 82 |
| Insoluble | 50 | 53 | 62 | 75 | 58 | 65 | 73 | 80 |

Analysis of the resulting foams showed that for each test condition, as the amount of co-agent was increased, the foam specific gravity increased, as did the hardness, 100% modulus, and tear strength. The results of the 50% compression set at room temperature for 22 hours shows no consistent pattern for either test condition. However, the results for 50% compression at 50° C. for 6 hours shows decreasing values as the co-agent is increased.

Both peroxides yielded similar foam densities, in the range of 0.2 to 0.36 g/cc. When comparing cure conditions and densities, for peroxide 2, higher cure temperatures with a less cure time yielded lower densities for all levels of peroxide used.

For hardness values, the higher cure temperature with a lower cure time consistently yielded a less hard foamed material. This may be due to less cure of the material, as evidenced by generally higher % insoluble xylene extraction results for foams subjected to the second set of cure conditions.

It was determined that a coagent to peroxide ratio of about 1.5 to 2 provides acceptable mechanical properties to the foamed material.

Figure 1:
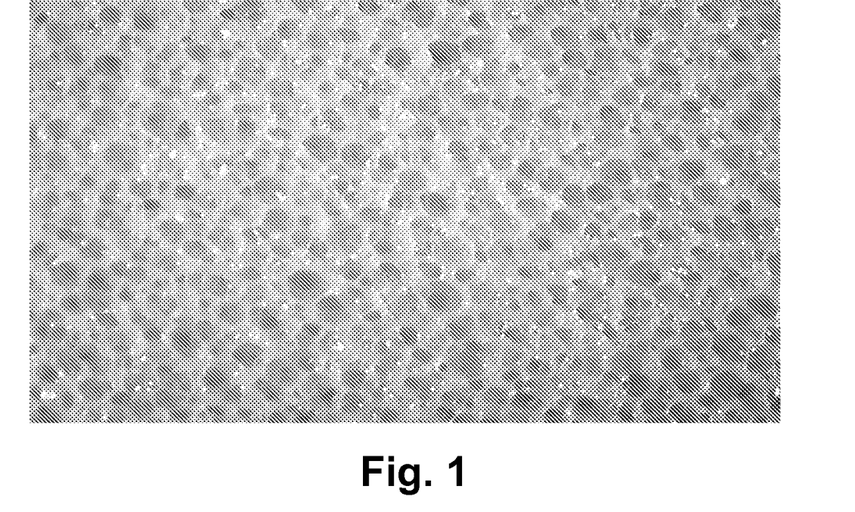
FIG. 1 is a sectional photo of a cellular material.
Figure 2:
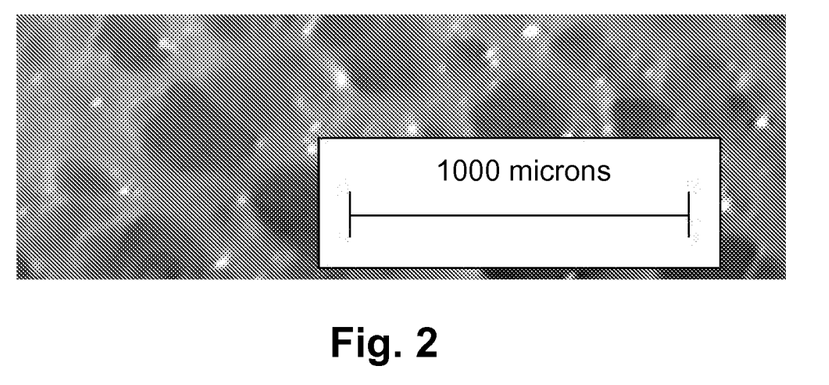
FIG. 2 is the scale and dimension of a portion of the material of FIG. 1.

A sample of Example A, having a cure temperature of 160° C. for 20 minutes, is shown in the FIGS. 1 and 2. FIG. 1 shows the cellular material and the general relationship of the cells in the material. FIG. 2 shows the scale and dimension of a portion of the material of FIG. 1. As can be seen, the foamed material is characterized by closely packed closed cells having a diameter in the cellular range of 0.2 to 0.55 mm.

Examples I-N

Exemplary foams prepared from different propylene based elastomers and blends of propylene based elastomer and secondary compounds, and the physical properties thereof, are set forth below in Table 4.

TABLE 4

|  | F* | G* | I | J | K | L | M | N |
|---|---|---|---|---|---|---|---|---|
| Material, phr | | | | | | | | |
| Polymer 1 | 100 | 100 | | | 50 | 80 | 80 | 80 |
| Polymer 2 | | | 100 | 100 | 50 | | | |
| Polymer 3 | | | | | | 20 | | |
| Polymer 4 | | | | | | | 20 | |
| Polymer 5 | | | | | | | | 20 |
| Stearic Acid | 0.6 | 0.6 | 0.6 | 0.6 | 0.6 | 0.6 | 0.6 | 0.6 |
| Zinc Oxide | 2 | 2 | 2 | 2 | 2 | 2 | 2 | 2 |
| Antioxidant | 0.2 | 0.2 | 0.2 | 0.2 | 0.2 | 0.2 | 0.2 | 0.2 |
| Blowing Agent | 2.3 | 2.3 | 2.3 | 2.3 | 2.3 | 2.3 | 2.3 | 2.3 |
| Peroxide 2 | 1.5 | 1.5 | 1.5 | 1.5 | 1.5 | 1.5 | 1.5 | 1.5 |
| Co-agent 1 | 1 | 2 | 1 | 2 | 2 | 2 | 2 | 2 |
| Properties | | | | | | | | |
| Foaming Temp, °C. | 170 | 170 | 170 | 170 | 170 | 170 | 170 | 170 |
| Cure Time, Minutes | 10.0 | 10.0 | 5.0 | 5.0 | 5.0 | 10.0 | 10.0 | 10.0 |
| Length Shrinkage | 1.2 | 1.6 | 5.2 | 8.3 | 2.5 | 0.8 | 3.7 | 2.0 |

TABLE 4-continued

|  | F* | G* | I | J | K | L | M | N |
|---|---|---|---|---|---|---|---|---|
| Width Shrinkage | 1.2 | 2.5 | 6.2 | 7.2 | 4.4 | 1.2 | 2.0 | 1.6 |
| Specific Gravity | 0.226 | 0.271 | 0.269 | 0.339 | 0.273 | 0.249 | 0.300 | 0.303 |
| Hardness | 68 | 74 | 75 | 79 | 76 | 77 | 74 | 75 |
| 100% Modulus, Mpa | 0.4 | 0.5 | 0.4 | 0.4 | 0.4 | 0.7 | 0.6 | 0.6 |
| Tear Strength, N/mm | 6.8 | 7.3 | 6.6 | 8.1 | 8.4 | 6.8 | 7.0 | 6.5 |
| Compression Set, % (25%, RT, 22 hrs) | 23 | 18 | 19 | 24 | 16 | 21 | 28 | 17 |
| Compression Set, % (50%, 50° C., 6 hrs) | 59 | 41 | 53 | 46 | 46 | 56 | 39 | 35 |
| Xylene Extraction, % Insoluble | 35 | 73 | 83 | 76 | 75 | 75 | 77 | 78 |

*data for second test conditions, as discussed above

In Examples I and J, a propylene based elastomer incorporating a deine, as discussed above, is the base polymer. In comparison to the non-diene containing propylene based elastomer, the foamed material of Examples I and J have an increase in shrinkage in both length and width as the foam expands from its procured dimensions and an increase in both foam specific gravity, hardness, while yielding comparable 100% modulus values.

Example K is a blend of propylene based elastomer and diene containing propylene based elastomer and contains 2.0 phr of peroxide 2. The foam material has physical properties closer to the non-diene propylene based elastomer.

In Examples L-N, the propylene based elastomer, polymer 1, is blended with other secondary ethylene based elastomers or plastics and the properties of the foamed material were determined. All other constituents of these blends were held constant, and included 2.0 phr of peroxide 2.

For the Example L, the shrinkage in both length and width is reduced in comparison to Example G (the most comparable example), and specific gravity of the foam sample is also decreased, while both hardness and 100% modulus are increased. For Example M, shrinkage is increased in one dimension while decreased in the other, with an increase in foam specific gravity. The hardness and 100% modulus is comparable to that of Example G. For Example N, the results are similar in comparison to Example P.

Examples O-R

Exemplary foams were prepared by varying the level of foaming agent with 100 phr of Polymer 1 and blends of Polymer 1 and polypropylenes. Also a third ethylene-propylene copolymer having characteristics as set forth above was blended with the higher level of foaming agent and is discussed below as Example R. All of the Examples were cured/foamed at 160° C., with individual samples of each exemplary composition cure for different times to determine the properties at each cure time. Compositions and properties of these foamed materials are set forth in Table 5 below.

TABLE 5

|  | O | P |  | Q |  | R |  |
|---|---|---|---|---|---|---|---|
| Material, phr |  |  |  |  |  |  |  |
| Polymer 1 | 100 | 95 |  | 95 |  |  |  |
| Polymer 2 |  |  |  |  |  |  |  |
| Polymer 6 |  |  |  |  |  | 100 |  |
| Polymer 7 |  | 5 |  |  |  |  |  |
| Polymer 8 |  |  |  | 5 |  |  |  |
| Stearic Acid | 0.6 | 0.6 |  | 0.6 |  | 0.6 |  |
| Zinc Oxide | 2 | 2 |  | 2 |  | 2 |  |
| Antioxidant | 0.2 | 0.2 |  | 0.2 |  | 0.2 |  |
| Blowing Agent | 4.8 | 4.8 |  | 4.8 |  | 4.8 |  |
| Peroxide 1 | 2 | 2 |  | 2 |  | 2 |  |
| Co-agent 1 | 3 | 3 |  | 3 |  | 3 |  |
| Properties |  |  |  |  |  |  |  |
| Foaming Temp, ° C. | 160 | 160 | 160 | 160 | 160 | 160 | 160 |
| Cure Time, Minutes | 5.0 | 20 | 5.0 | 10 | 5.0 | 10 | 20 |
| Length Shrinkage | −1.7 | 2.3 | −1.1 | 2.3 | −0.5 | 1.7 | 0.8 |
| Width Shrinkage | −4.7 | 3.9 | 1.2 | 1.8 | −1.15 | 1.9 | 0.4 |
| Specific Gravity | 0.132 | 0.159 | 0.121 | 0.117 | 0.145 | 0.130 | 0.159 |
| Hardness | 45 | 56 | 52 | 56 | 64 | 62 | 72 |
| 100% Modulus, Mpa | 0.1 | 0.3 | 0.3 | 0.3 | 0.09 | 0.51 | 0.6 |
| Tear Strength, N/mm | 2.7 | 3.9 | 3.7 | 3.5 | NA | NA | 8.4 |
| Compression set, % (50%, RT, 22 hrs) | 51 | 62 | 68 | 66 | 39 | 29 | 30 |
| Compression set, % (50%, 50° C., 6 hrs) | 93 | 98 | 85 | 76 | 95 | 44 | 93 |
| Xylene extraction, % insoluble | 57 | 80 | 78 | 79 | 65 | 80 | 74 |
| Coefficient of Friction | 2.2 | 2.3 | 1.0 | NA | NA | NA | 0.6 |

An analysis of properties of the different samples of Exemplary composition O shows length and width shrinkage increasing as the cure time increases. Hardness, specific gravity, modulus, and tear strength also increase. In comparison to the same polymer with a lower amount of blowing agent and peroxide, the closest comparison for Example O is Example D. The foamed material of Example O, comparing samples at the same cure time and temperature, exhibits greater shrinkage in both length and width. However, the specific gravity, hardness, modulus, and tear strength are all reduced in comparison to Example D.

For the polymer 1 blends, incorporating propylenes, at five minutes cure time, the shrinkage in both directions is less for the blends than for Example O; however, for cure times of 10 minutes, the first polymer blend P has mixed shrinkage change, while for the polymer blend of Example Q, shrinkage amounts are almost comparable. Specific gravity values are decreased for the polymer blends at the higher cure time, as are modulus and harness values.

For Example R, in comparison to Example O at 20 minutes cure time, the foamed material has reduced shrinkage in both directions, and increased hardness, modulus, and tear strength, with comparable specific gravity values.

Examples S-W

Comparisons of the inventive foam were also made to foams comprising styrene block copolymers. Example T is a comparative example of a 100 phr styrene block copolymer foamed material. Examples U, V, and W are blends of Polymer 1 with different amounts and types of styrene block copolymers. Compositions and physical properties of the material after curing and foaming are set forth in Table 6 below.

TABLE 6

|  | S | T | U | V | W |
|---|---|---|---|---|---|
| Material, phr |  |  |  |  |  |
| Polymer 1 | 100 |  | 75 | 50 | 80 |
| Polymer 9 |  | 100 | 25 | 50 |  |
| Polymer 10 |  |  |  |  | 20 |
| Stearic Acid | 0.6 | 0.6 | 0.6 | 0.6 | 0.6 |
| Zinc Oxide | 2 | 2 | 2 | 2 | 2 |
| Antioxidant | 0.2 | 0.2 | 0.2 | 0.2 | 0.2 |
| Blowing Agent | 4.8 | 4.8 | 4.8 | 4.8 | 4.8 |
| Peroxide 2 | 2 | 2 | 2 | 2 | 2 |
| Co-agent 1 | 2 | 2 | 2 | 2 | 2 |
| Properties |  |  |  |  |  |
| Foaming Temp, °C. | 160 | 160 | 160 | 160 | 160 |
| Cure Time, Minutes | 25 | 25 | 25 | 15 | 20 |
| Length Shrinkage | 3.8 | 2.9 | 3.8 | 4.1 | 4.7 |
| Width Shrinkage | 3.5 | 3.6 | 2.4 | 3.9 | 3.8 |
| Specific Gravity | 0.128 | 0.141 | 0.127 | 0.138 | 0.144 |
| Hardness | 44 | 65 | 50 | 56 | 54 |
| 100% Modulus, Mpa | 0.2 | 0.6 | 0.3 | 0.4 | 0.3 |
| Tear Strength, N/mm | 2.9 | 2.7 | 2.9 | 3.0 | 2.8 |
| Compression Set, % (50%, RT, 22 hrs) | 61 | 73 | 66 | 62 | 58 |
| Compression Set, % (50%, 50° C., 6 hrs) | 62 | 92 | 77 | 72 | 65 |
| Xylene Extraction, % Insoluble | 82 | 86 | 81 | 84 | 85 |
| Coefficient of Friction | 3.5 | 2.4 | 2.3 | 3.1 | 1.8 |

In comparing the inventive foam of Example S to the styrene block copolymer foam of comparative Example T, it can be seen that the foam material of Example S has increased shrinkage in both width and length, but a reduced specific gravity. Additionally, the tear strength is slightly improved in Example S and it also has a higher coefficient of friction.

In the 75/25 blend of Example U, the foam material has a specific gravity and tear strength comparable to that of Example S, while the hardness is increased.

In the 50/50 blend of Example V, for a reduced cure time, the specific gravity is low, while exhibiting higher hardness values over Example S.

In the 80/20 blend of Example W, in comparison to Example U, the specific gravity of the foamed material is greater for Example W; however, hardness, modulus, and tear strength are comparable.

Examples X-AA

Samples were made to determine the effect of using the propylene-α-olefin copolymer as a minor additive in compositions for foamed material. Such samples are Example Y to AA. Example X is a comparative example of an ethylene vinyl acetate (EVA) foam material; a material conventionally used as foamed material in the same applications for which the present invention is noted as being useful. The compositions of these samples and the properties of the foamed material are set forth in Table 7 below.

TABLE 7

|  | X | Y | Z | AA |
|---|---|---|---|---|
| Material, phr |  |  |  |  |
| Polymer 1 |  | 20 | 18 | 18 |
| Polymer 11 | 100 | 80 | 72 | 72 |
| Polymer 12 |  |  | 10 |  |
| Polymer 13 |  |  |  | 10 |
| Stearic Acid | 0.6 | 0.6 | 0.6 | 0.6 |
| Zinc Oxide | 2 | 2 | 2 | 2 |

TABLE 7-continued

|  | X | Y | Z | AA |
|---|---|---|---|---|
| Antioxidant | 0.2 | 0.2 | 0.2 | 0.2 |
| Blowing Agent | 4.8 | 4.8 | 4.8 | 4.8 |

TABLE 7-continued

|  | X | Y | Z | AA |
|---|---|---|---|---|
| Peroxide 2 | 2 | 2 | 2 | 2 |
| Co-agent 1 | 0 | 0 | 0 | 0 |
| Properties |  |  |  |  |
| Foaming Temp, ° C. | 160 | 160 | 160 | 160 |
| Cure Time, Minutes | 20 | 20 | 20 | 20 |
| Length Shrinkage | 0.9 | 1.7 | 1.7 | 1.6 |
| Width Shrinkage | 0.7 | 0.9 | 1.5 | 1.4 |
| Specific Gravity | 0.104 | 0.107 | 0.100 | 0.102 |
| Hardness | 67 | 66 | 63 | 62 |
| 100% Modulus, Mpa | 0.7 | 0.5 | 0.5 | 0.6 |
| Tear Strength, N/mm | 5.0 | 4.4 | 5.3 | 5.2 |
| Compression Set, % (50%, RT, 22 hrs) | 48 | 62 | 57 | 41 |
| Compression Set, % (50%, 50° C., 6 hrs) | 75 | 81 | 83 | 86 |
| Coefficient of Friction | 1.3 | 2.3 | 2.1 | 1.6 |

For Example Y, the use of 20 phr of the propylene-α-olefin copolymer with the EVA increased the shrinkage; however, the specific gravity, hardness, and modulus were comparable. Most notably, the addition of 20 phr of the propylene-α-olefin copolymer significantly increased the coefficient of friction of the Example.

For Examples Z and AA, a second minor polymer was added to the composition, a maleic anhydride grated copolymer of different mah concentration. Shrinkage of the foamed material was increased; however, again, specific gravity, hardness, and modulus values may be considered to be comparable. With the higher value mah concentration polymer, the coefficient of friction was significantly increased over the EVA foam material.

Examples AB-AE

Exemplary compositions were also prepared using different coagents with the propylene-α-olefin copolymer and different coagents with copolymer blends. The compositions and properties thereof are set forth in Table 8 below.

For Example AB, the closest comparison is Example O from Table 5; the difference is the change in co-agent—with Example AB using trimethylolpropane trimethacrylate as the curing agent. Two samples were cured at 160° for two different time periods. For the lower cure time, the change in co-agent resulted in a general increase in all properties—shrinkage in both directions increased, but so did specific gravity, hardness, and tear strength. At the higher cure time, shrinkage in both directions increased, accompanied by almost insignificant change in 100% modulus and tear strength.

For Example AC, the closest comparison is Example R from Table 5; however, no equivalent cure time samples were prepared. For the use of co-agent 2, with shorter cure times, the change is properties is mixed. The specific gravity of Examples AC, for both cure times, is low with a relatively high hardness value in comparison to Example AB.

For Examples AD and AE, the base polymer is a mixture of the ethylene-propylene copolymers, with both coagents. For all samples AD and AE, the hardness and 100% modulus values can be seen to be relatively unaffected by cure time or co-agent. The specific gravity of the samples remain within the desired foam specific gravity range.

The elastic foams from compositions described herein also exhibit good antiskid resistance and improved elastic and anti-skid properties over known conventional EVA foams. Additionally, the soft elastic foams of the present invention have a lower specific gravity than conventional TPU foams; enabling manufacture of a thicker foam piece for comparable weight. The foams can be used in a variety of applications, including, but not limited thereto: packaging, auto foams, sport and leisure equipment (such as shoes and diving equipment), shock absorbers, injection molded wheels, pipe insulations, cable insulation, anti-skid/carpet backings, mats, soft grips, shoe soles, seals and gaskets, elastic hygiene foams, elastic waist bands, diapers, adult disposable hygiene products such as disposable underwear, hospital sheeting and clothing. The inventive foams enable a product designer to

TABLE 8

|  | AB | | AC | | AD | | | AE |
|---|---|---|---|---|---|---|---|---|
| Material, phr | | | | | | | | |
| Polymer 1 | 100 | | | | 70 | | | 70 |
| Polymer 6 | | | 100 | | | | | |
| Polymer 2 | | | | | 30 | | | 30 |
| Stearic Acid | 0.6 | | 0.6 | | 0.6 | | | 0.6 |
| Zinc Oxide | 2 | | 2 | | 2 | | | 2 |
| Antioxidant | 0.2 | | 0.2 | | 0.2 | | | 0.2 |
| Blowing Agent | 4.8 | | 4.8 | | 4.8 | | | 4.8 |
| Peroxide 1 | 2 | | 2 | | 2 | | | 2 |
| Co-agent 1 | | | | | 3 | | | |
| Co-agent 2 | 3 | | 3 | | | | | 3 |
| Properties | | | | | | | | |
| Foaming Temp, ° C. | 160 | 160 | 160 | 160 | 160 | 160 | 160 | 160 |
| Cure Time, Minutes | 5.0 | 10.0 | 5.0 | 10.0 | 5.0 | 10.0 | 20.0 | 5.0 |
| Length Shrinkage | 1.1 | 0.7 | 1.2 | 1.0 | 1.2 | 4.4 | 6.6 | −1.2 |
| Width Shrinkage | 0.6 | 1.6 | 2.0 | 1.4 | 2.3 | 5.1 | 6.2 | 1.7 |
| Specific Gravity | 0.184 | 0.145 | 0.134 | 0.121 | 0.139 | 0.147 | 0.154 | 0.143 |
| Hardness | 60 | 50 | 70. | 67 | 50 | 53 | 53 | 50 |
| 100% Modulus, Mpa | 0.2 | 0.2 | 0.2 | 0.5 | 0.2 | 0.2 | 0.3 | 0.2 |
| Tear Strength, N/mm | 4.0 | NA | 3.4 | 6.7 | 3.6 | 3.8 | 3.3 | 4.0 |
| Compression Set, % (50%, RT, 22 hrs) | 99 | 29 | 53 | 59 | 44 | 39 | 51 | 66 |
| Compression Set, % (50%, 50° C., 6 hrs) | 103 | 87 | 82 | 97 | 93 | 77 | 71 | 97 |
| Xylene Extraction, % insoluble | 28 | 41 | 34 | 37 | 75 | 85 | 86 | 56 | provide for an increased level of cushioning and padding without increasing the weight or compromising the flexibility of the product.

What is claimed is:

1. A composition for making a closed cell polyolefin foam, wherein said foam has a closed cell diameter of from 0.3 mm to 1.5 mm, the composition comprising:
   a propylene based polymer comprising from about 5% to about 32% by weight ethylene units, the polymer having a heat of fusion, as determined by DSC, of less than 80 J/g, and a melt temperature, as determined by DSC, of less than 110° C., and a crystallinity of less than 40%;
   0.5 to 5 phr peroxide;
   1.0 to 5.0 phr blowing agent; and
   not more than 10 phr co-agent.

2. The composition of claim 1, wherein the propylene based polymer comprises from about 8% to about 25% by weight ethylene units.

3. The composition of claim 1, wherein the propylene based polymer is further comprised of one or more diene derived comonomer units.

4. The composition of claim 1, further comprising at least one additional thermoplastic or thermoelastic material, said additional material being present in amounts greater than 5 phr.

5. A crosslinked polyolefin foam material having a closed cell structure and a closed cell diameter of from 0.3 mm to 1.5 mm, the material comprising:
   a propylene based polymer comprising from about 5% to about 32% by weight ethylene units, the polymer having a heat of fusion, as determined by DSC, of less than 80 J/g, a melt temperature, as determined by DSC, of less than 110° C., and a crystallinity of less than 40%;
   0.5 to 5 phr peroxide;
   1.0 to 5.0 phr blowing agent; and
   not more than 10 phr co-agent.

6. The material of claim 5, wherein the propylene based polymer comprises from about 8% to about 25% by weight ethylene units.

7. The material of claim 5, wherein the propylene based polymer is further comprised of one or more diene derived comonomer units.

8. The material of claim 5, wherein the majority of the closed cells have a diameter in the range of 0.3 to 1.0 mm.

9. The material of claim 5, wherein the material is molded with a mold fill factor greater than 75%.

10. The material of claim 5, the material having a specific gravity in the range of 0.05 to 0.70 g/cc.

11. The material of claim 5, the material having a hardness in the range of 40 to 85, per ASTM 2240, and a 100% modulus in the range of 0.2 to 1.0 MPa, per ASTM D414.

12. The material of claim 5, the material having a coefficient of friction in the range of 1.0 to 4.0.

13. The material of claim 5, the material being at least partially cured, with a minimum of 35% cure.

14. The material of claim 5, the material having a tear strength in the range of 2.5 to 9.5 N/mm.

15. The material of claim 5, the material having a compression set, measured at 50° C. for 6 hrs, in the range of 40-100%.

16. An article comprising the foamed material of claim 5, the article being selected from the group consisting of packaging material, automobile foams, shoes, diving equipments, shock absorbers, injection molded wheels, pipe insulation, cable insulation, carpeting, mats, seals, gaskets, hygiene products, diapers, adult disposable underwear, hospital sheeting and clothing.

* * * * *